(12) United States Patent
Hellenbrand

(10) Patent No.: US 9,975,698 B2
(45) Date of Patent: May 22, 2018

(54) COMMISSIONING DEVICE FOR PIECE GOODS

(71) Applicant: CareFusion Germany 326 GmbH, Kelberg (DE)

(72) Inventor: Christoph Hellenbrand, Kaifenheim (DE)

(73) Assignee: Carefusion Germany 326 GmbH, Kelberg (DE)

(*) Notice: Subject to any disclaimer, the term of this patent is extended or adjusted under 35 U.S.C. 154(b) by 616 days.

(21) Appl. No.: 14/593,717

(22) Filed: Jan. 9, 2015

(65) Prior Publication Data

US 2016/0200512 A1    Jul. 14, 2016

(51) Int. Cl.
  *B65G 1/06* (2006.01)
  *B65G 1/137* (2006.01)
  *G07F 17/00* (2006.01)

(52) U.S. Cl.
  CPC .............. *B65G 1/06* (2013.01); *B65G 1/137* (2013.01); *G07F 17/0092* (2013.01)

(58) Field of Classification Search
  CPC .................................. B65G 1/06; B65G 1/137
  USPC ........................................................ 414/280
  See application file for complete search history.

(56) References Cited

U.S. PATENT DOCUMENTS

| 5,135,344 A * | 8/1992 | Kita ..................... B65G 1/0492 414/273 |
| 6,997,665 B2 * | 2/2006 | Bouche ................ B65G 1/0435 414/280 |
| 2003/0185656 A1 | 10/2003 | Hansl |
| 2004/0131451 A1 * | 7/2004 | Winkler ............... B65G 1/0435 414/278 |

(Continued)

FOREIGN PATENT DOCUMENTS

| DE | 198 15 883 A1 | 10/1999 |
| EP | 2 581 328 A1 | 6/2012 |

(Continued)

OTHER PUBLICATIONS

Search Report from corresponding EP Appln. No. 15150566.6 dated Jul. 2, 2015 (8 pages).

(Continued)

*Primary Examiner* — Jonathan Snelting
(74) *Attorney, Agent, or Firm* — McDermott Will & Emery LLP

(57) ABSTRACT

A commissioning device having a first shelf row with horizontal shelf surfaces and at least one second shelf row with multiple shelf surfaces disposed one above the other and forming storage shafts. A lane formed between the first and the second shelf rows includes an operating unit movably disposed in the lane. The commissioning device also includes an input device, an output device and an auxiliary output device. The operating unit includes a gripping device for inputting and/or outputting piece goods onto or from the (Continued)

horizontal shelf surfaces and for filling the goods into the storage shafts. A control unit coupled to the operating unit is configured to output identical piece goods in a row from the horizontal shelf surfaces, to input the piece goods into the storage shafts and to output and transfer one or more piece goods located on the horizontal shelf surfaces to the auxiliary output device.

20 Claims, 13 Drawing Sheets

(56) References Cited

U.S. PATENT DOCUMENTS

| | | | | |
|---|---|---|---|---|
| 2004/0253082 A1* | 12/2004 | Mathys | ................ | B65G 1/1378 |
| | | | | 414/280 |
| 2005/0008463 A1* | 1/2005 | Stehr | .................... | B65G 1/1378 |
| | | | | 414/277 |
| 2009/0129902 A1* | 5/2009 | Schafer | ................ | B65G 1/1378 |
| | | | | 414/274 |
| 2010/0089941 A1* | 4/2010 | Connier | .................. | B65G 1/08 |
| | | | | 221/123 |
| 2013/0149080 A1* | 6/2013 | Martin De Pablo | ..... | B65G 1/06 |
| | | | | 414/281 |

FOREIGN PATENT DOCUMENTS

| | | |
|---|---|---|
| JP | 2006 103876 A | 4/2006 |
| WO | WO 2003/010073 A1 | 2/2003 |
| WO | WO 2006/051329 A2 | 5/2006 |

OTHER PUBLICATIONS

International Preliminary Report and Patentability (IPRP) dated Jul. 20, 2017 in PCT/EP2016/050192 (9 pages).

\* cited by examiner

COMMISSIONING DEVICE FOR PIECE GOODS

BACKGROUND

The disclosed embodiments relate to a commissioning device and methods for outputting piece goods and in particular, a commissioning device and methods for outputting medicinal packages from storage.

In many medical treatment settings, it is desirable to provide a commissioning device that uses storage shafts and that can also store and output medicinal packages that are not compatible with storage shafts, or that have a much lower output frequency than that of medicinal packages stored in the storage shafts.

SUMMARY

The disclosed embodiments provide a commissioning device for piece goods. In some embodiments, the commissioning device includes at least one first shelf row having at least one first shelf comprising a plurality of shelf surfaces disposed one above the other, each shelf surface extending in a horizontal plane. The commissioning device also includes at least one second shelf row having at least one second shelf comprising a plurality of shelf surfaces disposed one above the other, each shelf surface extending in a horizontal plane. The commissioning device further includes a lane formed between the first and the second shelf rows and an operating unit configured to travel horizontally and vertically in the lane. The commissioning device also includes at least one input device configured to move piece goods into the commissioning device and from which the operating unit is configured to remove piece goods and at least one output device configured to output piece goods from the second shelf row. The commissioning device further includes at least one auxiliary output device configured to output piece goods held by the operating unit along an auxiliary output path. A plurality of parallel storage shafts are disposed on each shelf surface of the second shelf row, each of the storage shafts comprising a gate at the shaft end, the gate configured to hold and release piece goods lying in the storage shaft, the output device configured to output the piece goods from the storage shafts along a main output path. Also, the operating unit includes a gripping device for one of inputting and outputting piece goods onto or from the horizontal shelf surfaces and for filling the goods into the storage shafts. Further, a control unit coupled to the operating unit, the control unit configured to control the operating unit for inputting and outputting piece goods, wherein the operating unit is configured to remove identical piece goods lying in a row from the horizontal shelf surfaces and place the removed piece goods into the storage shafts, and wherein the operating unit is configured to output one or more piece goods located on the horizontal shelf surfaces and transfer the output piece goods to the auxiliary output device.

The disclosed embodiments provide methods for outputting piece goods from a commissioning device. Some methods include receiving an output request for at least one piece good and determining, by a control unit, whether the at least one piece good to be output is a shaft good or a shelf good. The methods also may include if it is determined that the good is a shelf good, grasping and transferring a number of the at least one piece goods corresponding to the output request to an auxiliary output device by an operating unit and if it is determined that the good is a shaft good, determining whether there is a corresponding number of the at least one piece goods stored in the storage shafts. The methods may further include if it is determined that a corresponding number of the at least one piece goods is stored in the storage shafts, outputting the number of the at least one piece goods corresponding to the output request out of the commissioning device and onto the output device and if it is determined that a corresponding number of the at least one piece goods is not stored in the storage shafts, grasping and outputting a plurality of the at least one piece goods stored on horizontal shelf surfaces corresponding to the output request by the operating unit.

The disclosed embodiments provide a commissioning device. In some embodiments, the commissioning device includes a first shelf row comprising one or more first shelf surfaces and a second shelf row comprising one or more second shelf surfaces. The commissioning device also includes a plurality of parallel storage shafts disposed on each second shelf surface, each of the storage shafts comprising a gate disposed at an end, the gate configured to hold and release piece goods stored in the storage shaft. The commissioning device further includes an operating unit configured to be movable in a lane disposed between the first and second shelf rows, the operating unit comprising a gripping device configured to input piece goods onto the first shelf surfaces, output piece goods from the first shelf surfaces, and fill piece goods into the storage shafts. The commissioning device also includes an input device configured to move piece goods into the commissioning device and an output device configured to output piece goods from the storage shafts along a main output path. The commissioning device further includes an auxiliary output device configured to output piece goods held by the operating unit along an auxiliary output path and a control unit configured to control the operating unit for inputting and outputting piece goods.

The foregoing and other features, aspects and advantages of the disclosed embodiments will become more apparent from the following detailed description and accompanying drawings.

DETAILED DESCRIPTION

Figure 1:
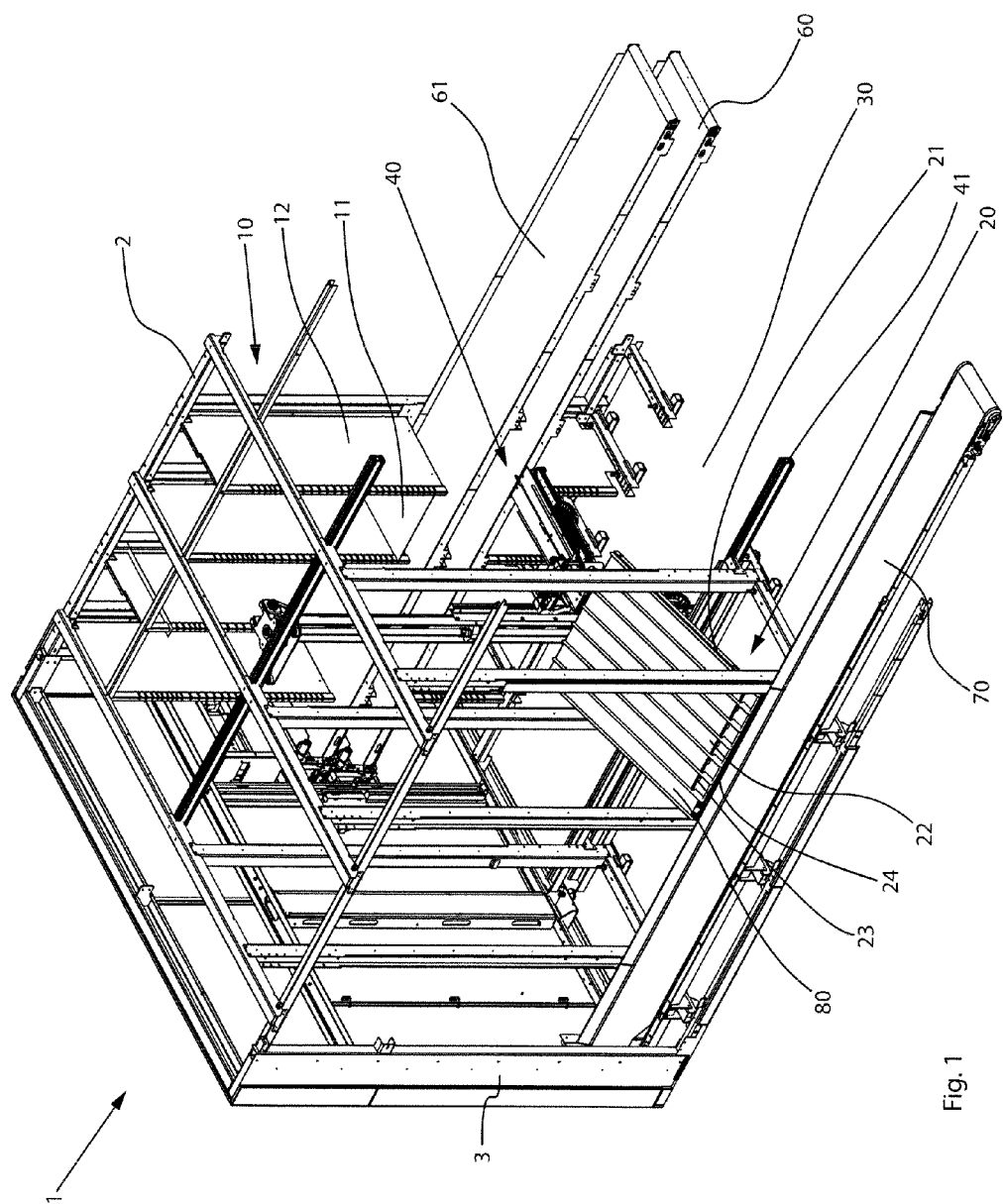
FIG. 1 is a perspective view of an embodiment of a commissioning device.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

Automated commissioning equipment is used frequently in pharmacies in order to store medicinal packages in a way that saves space. In typical commissioning devices applicable to pharmacies, the medicinal packages are stored chaotically. In other words, the medicinal packages are not stored in pre-determined storage spaces in the device, but rather in storage spaces with just the right amount of space. Excess empty volume can be avoided this way and the number of stored medicinal packages per square foot of surface area can be considerably increased. The commissioning devices that operate according to this system include a complex storage system that assigns storage spaces optimally. However, commissioning devices that operate in this manner are unsuitable for medicine distribution centers or large pharmacies that have a very high output frequency (e.g., high number of medicinal packages per unit of time) since the chaotically stored medicinal packages cannot be output fast enough.

Therefore, when there are very high output frequencies, the commissioning systems that are used are those with so-called shaft systems in which the medicines are selectively stored. Each storage shaft preferably has a gate at the lower end thereof controllable by an operating unit, the gate allowing one or more medicinal package to be discharged from the storage shaft. The number of different medicines that can be stored using a commissioning device with selective storage shafts corresponds at most to the number of selective storage shafts. However, for typical commissioning devices that use storage shafts, medicinal packages cannot be stored in them if the packages cannot be stored in a shaft. For example, packages of a special shape, packages that need to be cooled, or packages that are not dispensed very often such that storage in a selective shaft would not make sense.

Accordingly, a commissioning device is provided that uses storage shafts and may also store and output medicinal packages that are not compatible with storage shafts or that have a much lower output frequency than that of medicinal packages stored in the storage shafts.

The commissioning device includes at least a first shelf row with at least a first shelf, the shelf having a plurality of shelf surfaces disposed one above the other, each of said self surfaces extending in the horizontal plane, and at least a second shelf row with at least a second shelf, the second shelf having a plurality of shelf surfaces disposed one above the other, each of said second shelf surfaces extending in a plane. When the commissioning device includes a plurality of shelves per shelf row, all of the shelves may be configured to be identical, but it is also configurable for different shelves with shelf surfaces separated by different distances to be installed, for example.

A lane is configured between the first and the second shelf rows, with a horizontally and vertically movable operating unit being disposed in the lane at a corresponding guide member. The lane is defined by the ends (e.g., loading edges) of the shelf surfaces, the ends normally located in a vertical plane for each shelf row such that the planes of opposing shelf rows run parallel to one another.

The commissioning device further includes at least one input device for moving piece goods into the commissioning device, the operating unit configured to remove piece goods from the input device. Also included are at least one output device configured to output piece goods from the second shelf row, among others, and at least one auxiliary output device configured to output along an auxiliary output path piece goods that are taken up by operating unit. Multiple parallel storage shafts are configured on each shelf surface of the second shelf row, each of the storage shafts having at its respective end a gate for holding and releasing piece goods lying in the storage shaft. From the storage shafts, piece goods may be output along a main output path by way of the output device.

The operating unit of the commissioning device includes a gripping device for inputting and/or outputting piece goods onto or from the horizontal shelf surfaces, and for filling piece goods into the storage shafts or routing the piece goods onto the auxiliary output device. The operating unit also includes a controller coupled to the operating unit, the controller controlling the operating unit in inputting and outputting the piece goods. The control unit is configured such that the operating unit is controllable for the purposes of outputting from the horizontal shelf surfaces identical piece goods that lie in a row and for inputting the piece goods into the inclined storage shafts, and for outputting one or more piece goods located on the horizontal shelf surfaces and transferring these piece goods to the auxiliary output device.

Thus, in the commissioning device two kinds of storage spaces are combined. For example, the storage shafts of the second storage shelf row and the horizontal shelf surfaces of the first shelf row. Medicinal packages with a high output frequency are stored by type in the storage shafts. An excess supply of medicinal packages to be stored in the storage shafts may be placed on the horizontal shelf surfaces (e.g., an amount in addition to the piece goods located in the storage shafts), or medicinal packages that cannot be stored in storage shafts or that cannot be output thereby may be placed on the horizontal shelf surfaces. Further, medicinal packages that may be located or stored on the horizontal shelf surfaces are those for which the output frequency is too low to be stored in the storage shafts, for which the weight of the medicinal package is too heavy, or for which there is no storage shaft available based on dimensions of the medicinal package.

The piece goods with high output frequency are output by way of the storage shafts. However, to output piece goods that cannot be output by way of storage shafts or goods that are not stored in an inclined shaft due to a low output frequency, the commissioning device includes an auxiliary output device to which piece goods may be fed using the operating unit. The piece goods are then moved out of the commissioning device along an auxiliary output path by way of this auxiliary output device.

The commissioning device may store and output piece goods (e.g., medicinal packages) with a high output frequency in the storage shafts, as well as piece goods with a low output frequency or goods that cannot be output using the inclined storage shafts together in a single commissioning device without reducing the output rate of the commissioning device. Piece goods with a high output frequency may be output using the storage shafts, each of which is provided with a gate, while in parallel, the piece goods stored on the horizontal shelf surfaces may be output by way of the auxiliary output device using the operating unit.

Piece goods that are stored in the shafts, and if necessary, on the horizontal shelf surfaces as excess supply, are herein defined as "shaft goods." Piece goods that are stored on a horizontal shelf surface because of the conditions mentioned above are herein defined as "shelf goods." While the packages described herein are in the context of medicinal packages, other kinds of piece goods may also be processed using the commissioning device.

The piece goods are output from the storage shafts by releasing the gate and moving the piece goods out of the shaft using an appropriate device associated with the storage shaft (e.g., when the shaft is horizontal).

In a preferred embodiment of the commissioning device, the shelf surfaces of the second shelf row are configured at an incline downward away from the lane (e.g., inclined storage shafts). This provides for outputting the piece goods by opening the gate associated with a storage shaft. The piece good drops out of the storage shaft and onto the output device by gravity due to the incline of the storage shaft. In other embodiments, the second shelf row may be configured to combine shelves with horizontal shelf surfaces and shelves with inclined shelf surfaces.

As previously discussed, a lane is formed between the first and the second shelf rows, with the operating unit being movable therein horizontally and vertically on a corresponding guide. In order to move piece goods easily and quickly from the horizontal shelf surfaces to the storage shafts (e.g., inclined storage shafts), that is to move piece goods from the excess supply to the storage locations from which they are ultimately output, a preferred embodiment provides that the gripping device of the operating unit includes a horizontal holding surface with opposing loading edges, a gripper for inputting and outputting the piece goods onto and from the horizontal shelf surfaces and a pushing device for pushing piece goods onto the holding surface. A transport path is formed for piece goods between the loading edges and the holding surface extends over the entire width of the lane. Thus, the loading edges of the holding surface align with loading edges of the horizontal shelf surfaces or shafts such that piece goods may be moved onto or from the horizontal shelf surfaces or from the holding surface into the shafts without moving the holding surface. This is achieved by aligning the width of the holding surface with the width of the lane. For example, keeping the distance between the loading edges of the holding surface and the ends and loading edges of the shelf rows small enough that preferably no piece goods may get wedged in the gap between the loading edges, but not so small that the operating unit cannot freely move in the lane (keeping in mind that some shelf surfaces may extend slightly wider into the lane than others).

Thus, it is not necessary for the gripping device to be pivoted about a horizontal pivoting axis after the piece goods are moved to the holding surface in order to feed the piece goods to the storage shafts over the same loading edge. The commissioning device provides for the piece goods to be moved to the shafts using the pushing device after the goods are moved to the holding surface by way of the gripper. To this end, a transport path is provided between the loading edges of the holding surface. Thus, piece goods may be fed from the horizontal shelf surfaces to the storage shafts or to the auxiliary output device very quickly.

Occasionally, it is desirable to transfer piece goods stored on the horizontal shelf surfaces as excess supply for piece goods stored in the storage shafts (e.g., in order to move the goods closer to the storage shaft through which they are ultimately output). To support the movement of piece goods from the holding surface to the horizontal shelf surfaces, a preferred embodiment provides that the pushing device includes two pushing members for moving piece goods from the holding surface in opposite directions. For example, in one case to the storage shafts and in the other case onto the horizontal shelf surfaces.

In some embodiments, the pushing members of the gripping device may be moved in a notch of the holding surface and also beneath the notch. In some embodiments, the pushing members are disposed and movable at a point on the gripping device which is otherwise free of other components. The gripper is located at the side surfaces of the holding surface (e.g., if the gripper is a jaw-type gripper) so that a good distribution of individual components of the gripping device is achieved.

The pushing members are used to feed the piece goods located on the holding surface to the storage shafts and elsewhere. In inclined storage shafts, the piece goods slide down to the gate or to a piece good already located in the storage shaft by the force of gravity. In order to guarantee that the piece goods slide into the inclined storage shafts by the force of gravity, in particular in the case of very small and/or light piece goods, a preferred embodiment provides that a pushing member includes a pushing finger that may be movable over a loading edge. This ensures that when moving a piece good from the holding surface to an inclined storage shaft, the center of gravity of the piece good is moved out over the loading edge so that the piece good slides down the inclined storage shaft.

To provide for piece goods of different dimensions to be stored, a preferred embodiment provides that the inclined shelf surfaces of the second shelf row are configured such that storage shafts of different heights are formed.

Piece goods that are output using the auxiliary output device are those that may either not be output using an inclined storage shaft (e.g., because of shape) or for which the output frequency is so low that storing the piece goods in a storage shaft does not make sense. The auxiliary output device may be configured as a slide next to the second shelf row, for example. Piece goods may be led from the operating unit to the actual output device or out of the commissioning device. However, in preferred embodiments the auxiliary output device is configured on the shelf surface of the second shelf row. In these preferred embodiments, therefore, part of a shelf surface is not provided as a storage shaft, but rather the auxiliary output device is configured in this area. In these embodiments, the auxiliary output device is therefore not embodied by a stand-alone component, but by existing components. In this regard, in an especially preferred embodiment the auxiliary output device is configured as an inclined storage shaft without a gate.

Methods of using a commissioning device as described above are also contemplated. In response to an output request (e.g., a request for outputting a certain number of piece goods) for one or more piece goods by the control unit of the commissioning device, a determination is made as to whether the at least one piece good to be output is a shaft good or a shelf good. The output request may be transmitted to the control unit through a cabled or wireless network connection, for example.

After the determination is made as to whether the at least one piece good to be output is a shaft good or a shelf good, if it is a shelf good a number of piece goods corresponding to the output request are collected by the operating unit and transferred to the auxiliary output device. To this end, the corresponding number of piece goods are moved to the holding surface using the gripper of the operating unit, and then transferred to the auxiliary output device which outputs the piece goods, or the outputting may be by way of the actual output device of the commissioning device. Alternatively, the commissioning device may also be configured such that the auxiliary output device ends at a removal point (e.g., the outputting is executed without any intermediate switching of the actual output device). One piece good or multiple piece goods (e.g., shelf goods) may be output according to the output request, wherein the outputting may occur in succession or in parallel (e.g., if there are multiple operating units) depending on the precise configuration of the commissioning device. If there is only one operating unit, either each piece good is output individually or first all piece goods are moved to the holding surface (e.g., from different horizontal shelf surfaces if necessary) and then transferred together from the holding surface to the auxiliary output device.

If the piece goods to be output are shaft goods (e.g., piece goods that are normally stored in the storage shafts), a determination is first made as to whether a number of piece goods corresponding to the output request are stored in the storage shafts. If so, a number of piece goods corresponding to the output request are output onto the output device and therefrom out of the device by actuating the gate or the gates of the storage shaft or shafts in which the piece goods are stored, and if necessary, by actuating a corresponding device for moving the piece goods out of the storage shaft. For the case that a number of piece goods corresponding to the output request are not stored in the storage shafts, a plurality of piece goods stored on the horizontal shelf surfaces (e.g., goods from the excess supply) are grasped by the operating unit and a number of piece goods corresponding to the output request is output.

The plurality of piece goods may be precisely the number of piece goods requested, which are then output. However, more piece goods than the number requested may be removed from the excess supply. The requested piece goods are output, and the excess piece goods are moved to the storage shaft for subsequent output requests.

The requested number of piece goods may be only partially available in the storage shafts. In this case, the portion of requested piece goods still available in the storage shafts may be output using the shafts and the remaining portion may be removed and output from the horizontal shelf surfaces.

The piece goods not stored in the storage shafts are output by moving the operating unit to the auxiliary output device and transferring a number of piece goods corresponding to the output request to the auxiliary output device and outputting them. Alternatively, the piece goods not stored in the storage shafts may be output by moving the operating unit to a storage shaft, transferring all piece goods to the storage shaft and actuating the gate of the inclined storage shaft such that a number of piece goods corresponding to the output request onto the output device may be output (e.g., by the force of gravity for inclined storage shafts or using a corresponding device for horizontal storage shafts).

It is further contemplated that if the number of piece goods stored in the storage shafts does not correspond to the output request, a plurality of piece goods corresponding to the output request is removed from the horizontal shelf surfaces (e.g., from the excess supply) using the operating unit, a number of piece goods corresponding to the output request are output (e.g., using the auxiliary output device or using the storage shafts) and the piece goods still located on the holding surface of the gripping device are moved to an inclined storage shaft. In this case, the requested piece goods are output and in addition other piece goods are placed in an inclined storage location.

The input device may be configured such that a plurality of identical piece goods may be arranged next to one another on the input device in order to fill the storage shafts. Here, the input device may be much wider than a normal piece good (e.g., 5-8 times the width of a normal piece good). Alternatively, the piece goods may also be placed individually on the input device, particularly when shelf goods are to be input.

FIG. 1 shows a perspective view of a commissioning device 1, wherein some non-essential elements of the commissioning device, such as portions of the framework structure 2 and some of the exterior paneling 3, are omitted. The commissioning device 1 includes a first shelf row 10 with multiple shelves, each of which includes multiple shelf surfaces 11 disposed one above the other and that extend in a horizontal plane. While only one shelf surface 11 is indicated in FIG. 1, other shelf surfaces may be disposed above the shelf surface shown. The individual shelves of the first shelf row 10 are formed by shelf walls 12 and the multiple shelf surfaces 11. In the embodiment shown, all end edges (e.g., loading edges) of the shelf surfaces are located in a vertical plane. For example, all shelf surfaces may extend equally far into the commissioning device.

The embodiment of the commissioning device shown in FIG. 1 includes two input devices 60, 61 configured as conveyor belts and which are integrated into the first shelf row. For example, there are shelves provided above and below the two input devices 60, 61, the shelves including horizontal shelf surfaces 11. The input devices 60, 61 are disposed and dimensioned such that the input devices 60, 61 end flush with the vertical planes mentioned above (e.g., because of the device widths). A corresponding arrangement of input devices and shelf surfaces makes it particularly easy to remove piece goods from the input devices and to place the piece goods onto the shelf surfaces.

Opposite the first shelf row 10 is a second shelf row 20 that comprises a plurality of shelves with inclined shelf surfaces 21, wherein in the embodiment shown only one inclined shelf surface 21 is shown. In the embodiment shown, the end edges (e.g., loading edges) of the inclined shelf surfaces that are turned into the commissioning device also end in a vertical plane, wherein this plane runs parallel to the plane defined by the end edges of the horizontal shelf surfaces.

Multiple storage shafts 22 are formed on each shelf surface 21, each shaft having a gate 23 at a lower end 24 of the shaft (e.g., the gate being coupled to a control unit not shown in FIG. 1) for holding and releasing piece goods lying in the storage shaft 22. Below the inclined shelf surface is an output device 70 onto which the piece goods located in the inclined storage shafts fall when the gates of the inclined storage shafts are actuated, and by way of which the requested piece goods are moved out of the commissioning device 1. In the embodiment shown in FIG. 1, the output device 70 is configured as a conveyor belt.

Between the first and the second shelf rows 10, 20 is a lane 30, the width of which is defined by the distance between the two vertical planes and into which an operating unit 40 may travel horizontally and vertically at a corresponding guide 41. In FIG. 1, a horizontal guide 41 of the operating unit 40 in particular can be seen.

The commissioning device 1 further includes an auxiliary output device 80 which allows for the outputting of piece goods, in particular those which are not stored in the inclined storage shafts 22 since the piece goods are either not capable of being stored in the inclined storage shafts 22, for example because of shape, or which are so seldom output or requested that inputting these piece goods in the inclined storage shafts 22 is not desirable because the inclined storage shafts 22 may be better occupied by frequently requested piece goods. In the embodiment shown, the auxiliary output device 80 is formed on an inclined shelf surface 21 as a storage shaft with a lower end having no gate. If a piece good is to be output by way of the auxiliary output device 80, the piece good is removed from a horizontal shelf surface 11 by the operating unit 40 (which is described in more detail below) and fed to the auxiliary output device 80, along which the piece good slides onto the output device 70. In alternative embodiments, the auxiliary output device 80 may be disposed next to the second shelf row 20 as a "stand-alone" component, for example. This can be a necessity when piece goods that are stored and output by way of the auxiliary output device 80 have dimensions that prevent the piece goods from being output between the inclined shelf surfaces 21 due to the arrangement thereof.

Figure 2:
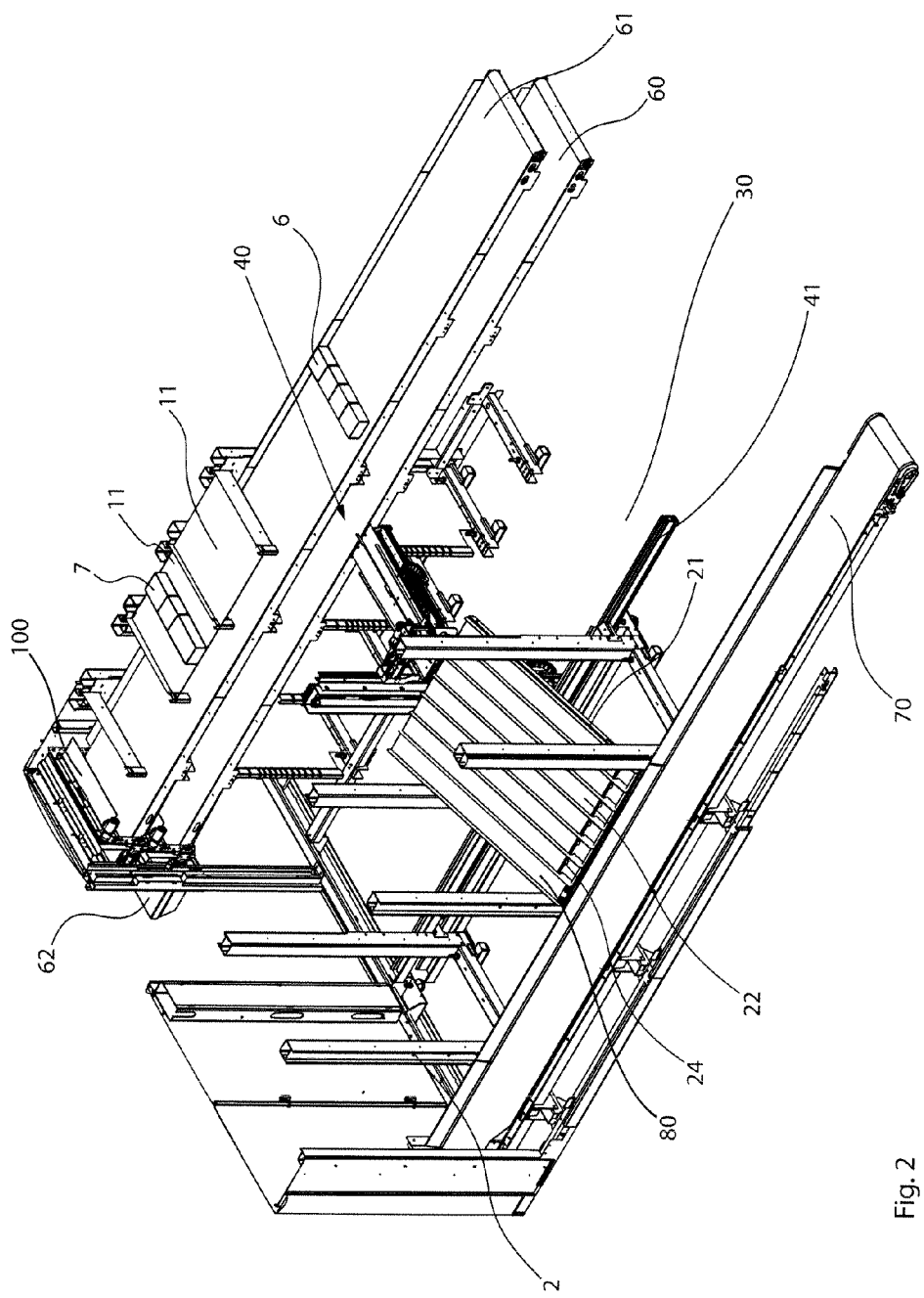
FIG. 2 is a perspective cross-sectional view of the commissioning device of FIG. 1.

FIG. 2 shows a sectional view of the embodiment shown in FIG. 1, in which the upper half of the commissioning device 1 is omitted. In this sectional view in particular, the arrangement of horizontal shelf surfaces 11 of the first shelf row 10 can be seen. It is further clear that the ends of the horizontal shelf surfaces 11 and the sides of the output devices 60, 61 all lie in a plane. As can be seen in this view, each input device 60, 61 includes an associated identification device 100 for determining data on the piece goods 6 lying on the input device 60, 61 (e.g., dimensions of the piece goods, identification of piece goods, number of piece goods). It can also be seen that each input device 61, 60 includes an outer area 62 that protrudes beyond the leading front of the commissioning device 1 and on which the piece goods 6 to be input are placed for inputting, wherein the normal process is such that a plurality of identical piece goods 6 is placed. The identical piece goods are moved into the commissioning device 1 using the input device 60, 61. In the commissioning device 1, the piece goods 6 are removed from the input device 60, 61 together by the operating unit 40 if they are identical piece goods 6 and are fed to an inclined storage shaft 22 or a horizontal shelf storage 11.

In FIG. 2, there are a few shelf-type piece goods 7 arranged on the horizontal shelf surfaces and four shaft-type piece goods 6 are indicated on the upper input device. Here, it can be seen how the shaft-type piece goods 6 in particular are advantageously placed on the input device 60,61, namely identical shaft-type piece goods 6 all in a row so that all four shaft-type piece goods 6 may be grasped by the operating unit 40 and moved to the pre-determined inclined storage shaft 22 at the same time.

Figure 3:
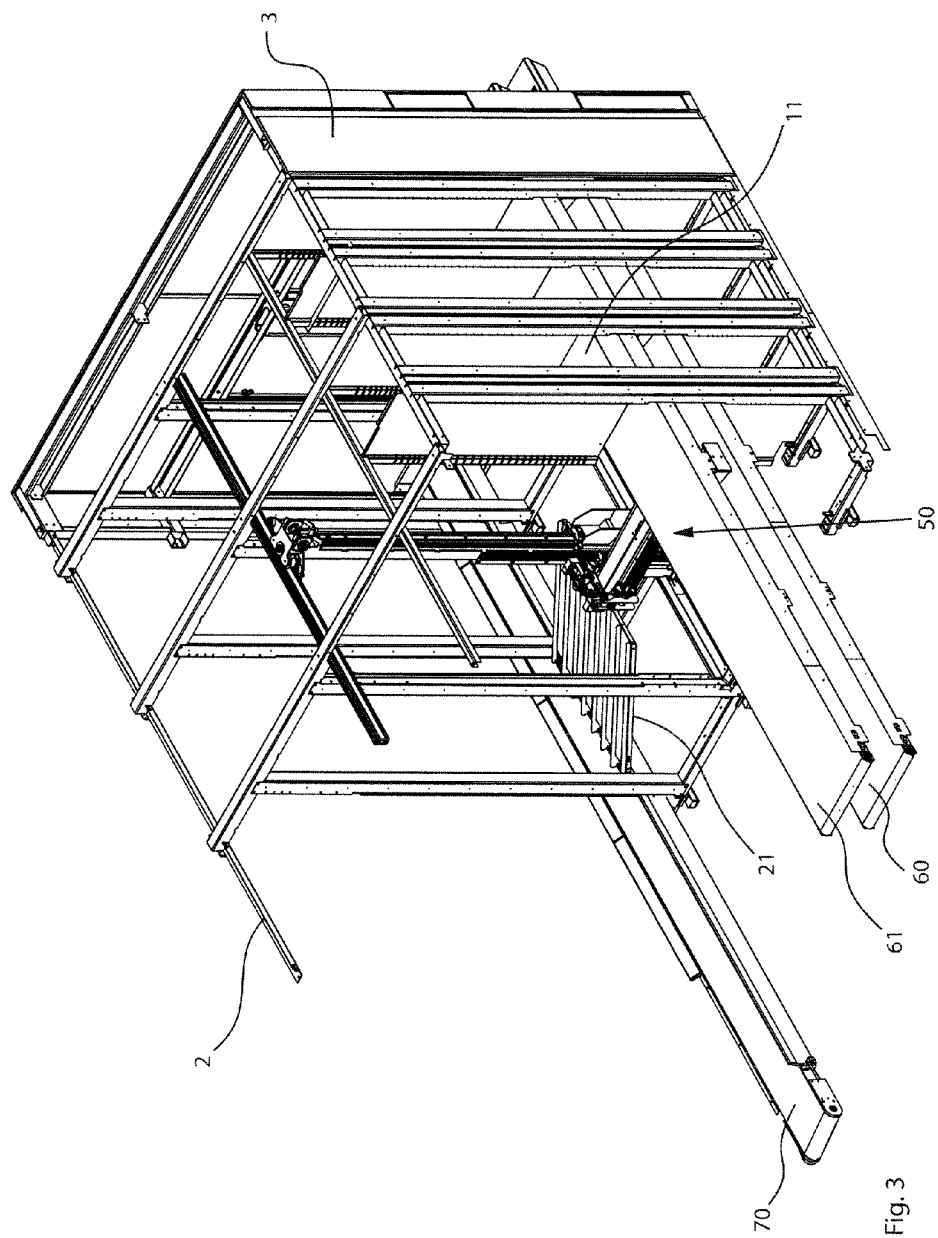
FIG. 3 is another perspective view of the commissioning device of FIG. 1.

FIG. 3 shows an alternative perspective view of the embodiment already shown in FIG. 1. This view shows the commissioning device 1 from another side. There are otherwise no difference between the views according to FIGS. 1 and 3.

Figure 4:
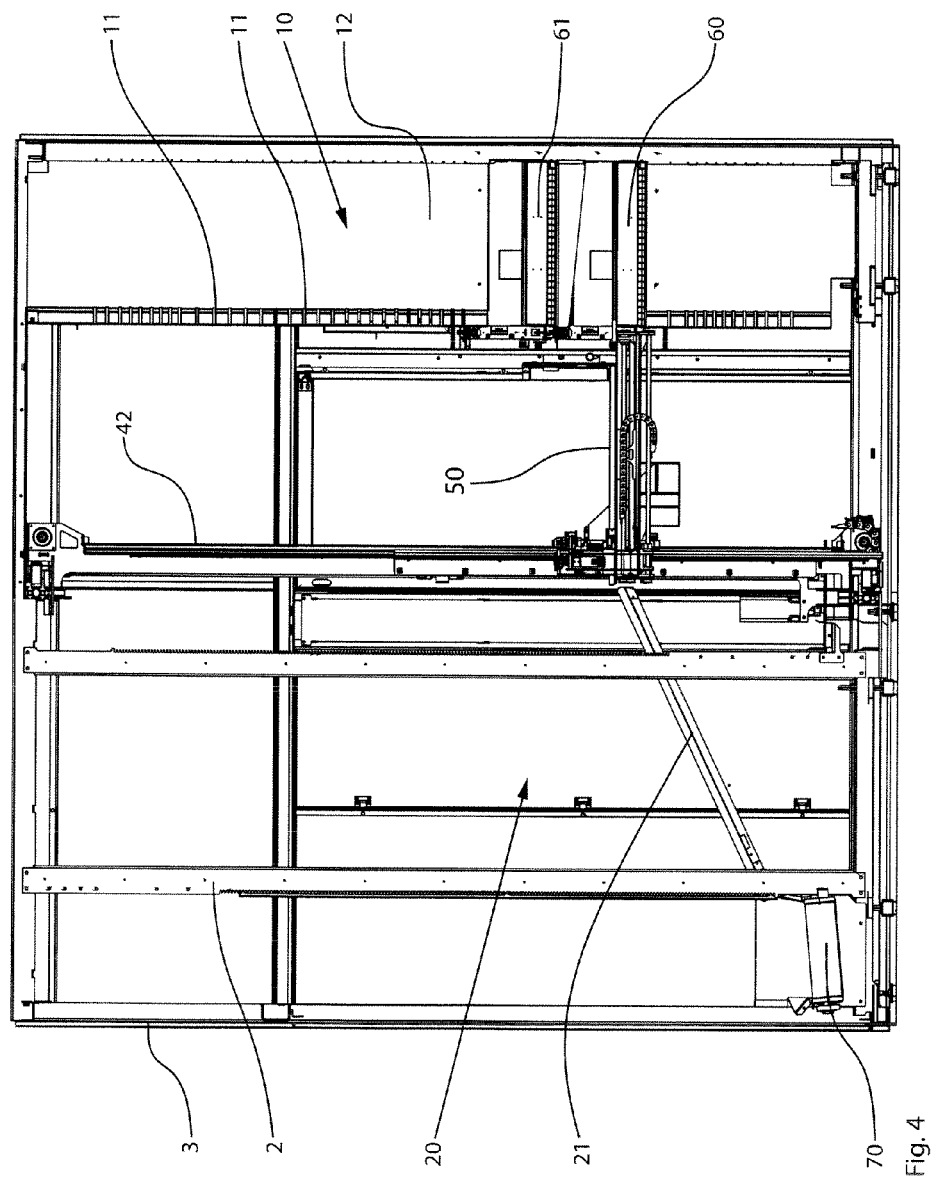
FIG. 4 is a rear view of the commissioning device of FIG. 1.

FIG. 4 shows a rear view of the embodiment of the commissioning device 1, with the inside of the commissioning device 1 being visible with the exterior panels 2 being omitted. The two shelf rows 10, 20 can be seen disposed opposite one another, with only one shelf surface 21 of the second shelf row 20 being shown. Formed between the first and the second shelf rows 10, 20 is the lane 30 in which the operating unit 40 may travel horizontally and vertically, wherein this figure shows a vertical guide 42 in particular for the operating unit 40. The operating unit 40 includes a gripping device 50, which is easily seen in the rear view. The gripping device 50 completely traverses the lane 30, being thereby capable of traversing the distance between the first shelf row 10 and the second shelf row 20 while ensuring freedom of motion in the lane 30. As can be easily seen in this representation, the inclined shelf surfaces 21 of the second shelf row 20 are inclined outward away from the lane 30 to the output device 70. In this representation, it is also easily seen that access to both input devices 60, 61 is possible using the gripping device 50. The horizontal shelf surfaces 11 and the input devices 60, 61 extend up to the same vertical plane. The same applies to all of the inclined shelf surfaces 21.

Figure 5:
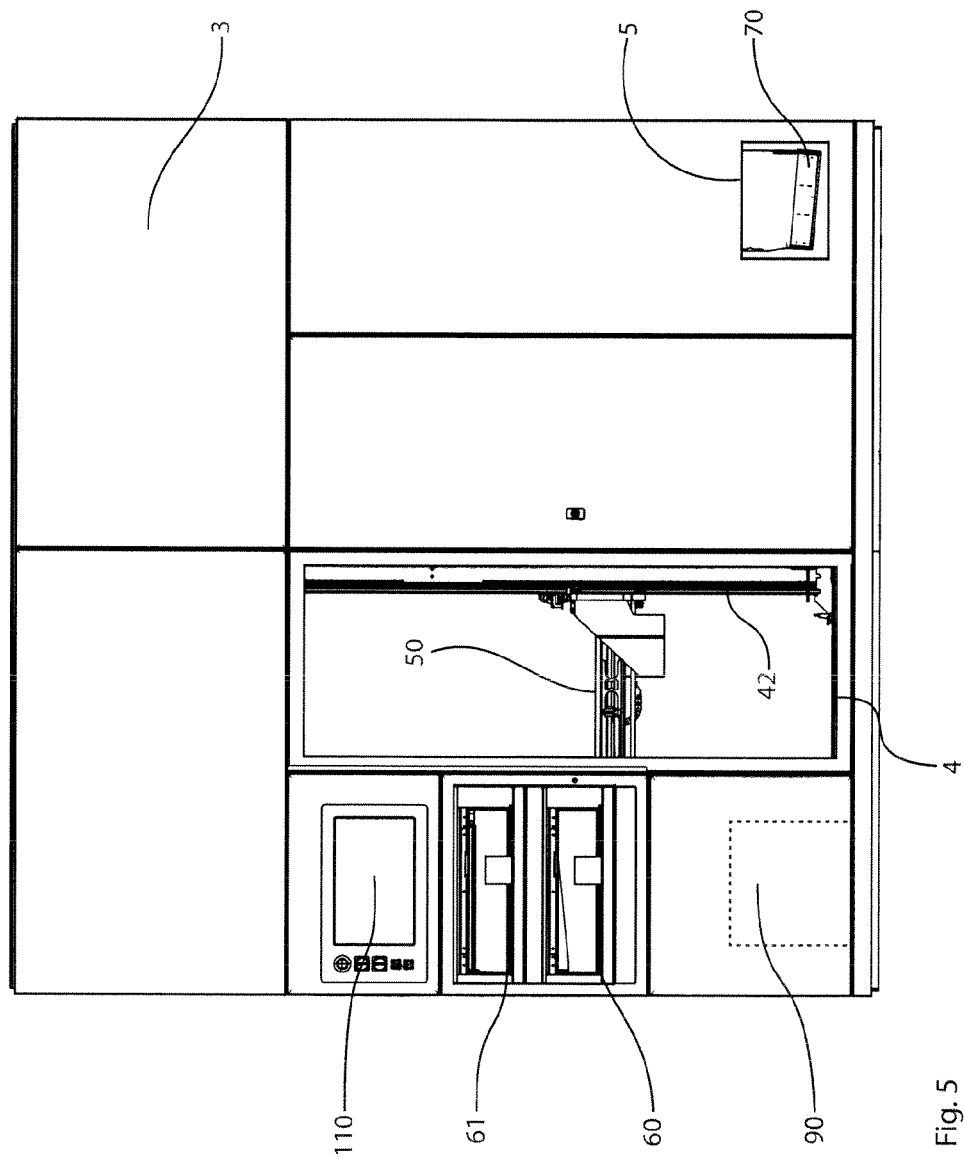
FIG. 5 is a front elevation view of the commissioning device of FIG. 1.

FIG. 5 shows a front view of the commissioning device 1. As can be seen in this front view, both input devices 60, 61 are disposed below a display unit 110, one atop the other. A variety of kinds of information about the commissioning device 1 may be displayed using the display unit 110, and the display unit 110 is coupled to an input device (not shown). Below the input devices 60, 61 is the control unit 90, which is covered by part of the panel 3 of the commissioning device 1. The control unit 90 is coupled to the input devices 60, 61, the output device 70, the display unit 110 and the operating unit 40, among other things.

A door opening 4 is provided in the front side of the commissioning device 1 for entering the commissioning device 1 in case of a disruption or for maintenance purposes. There is also another opening 5 provided in the front side off the commissioning device 1 through which part of the output device 70 extends, and through which piece goods are moved out of the commissioning device 1.

Figure 6:
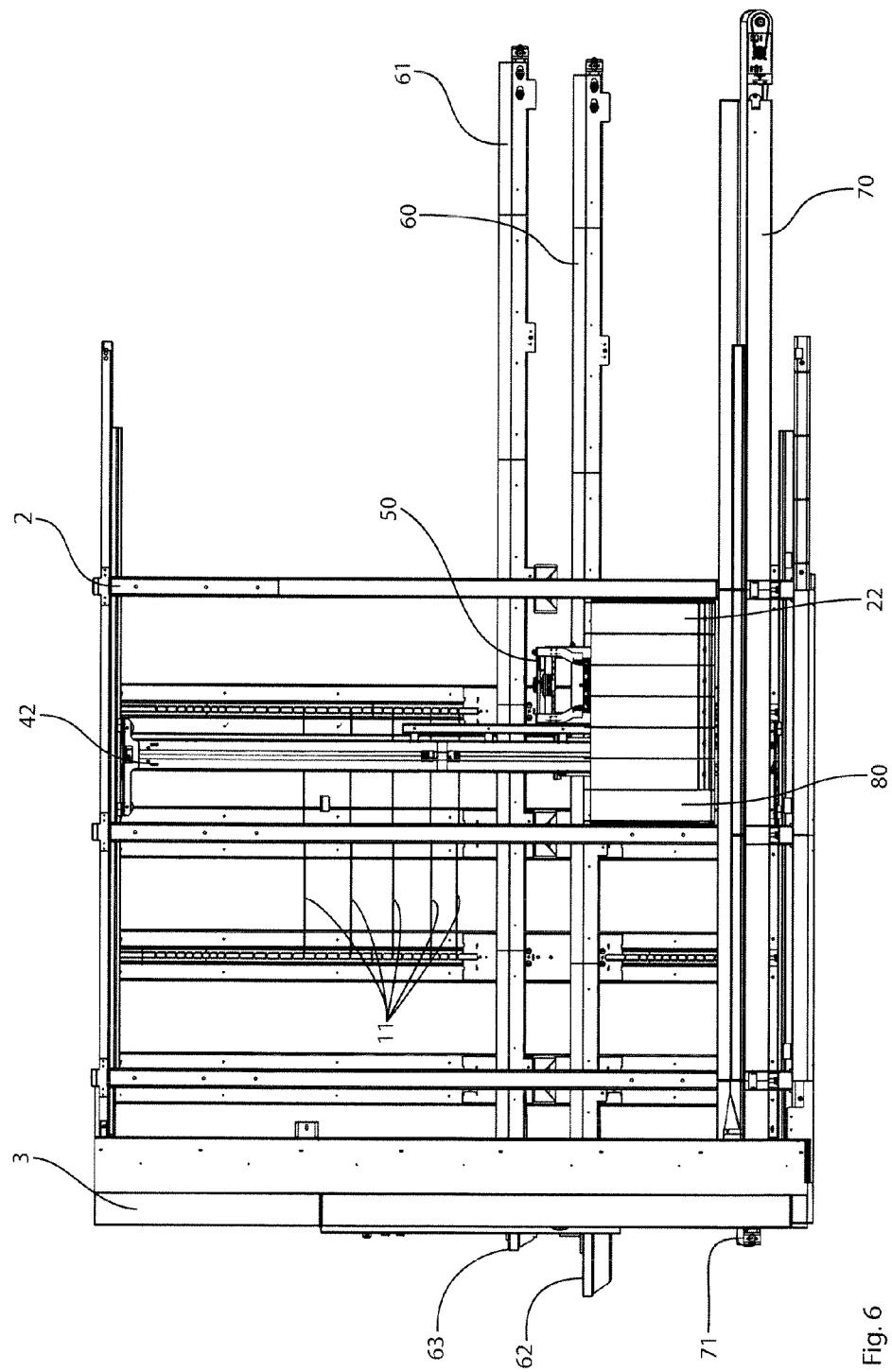
FIG. 6 is a side view of the commissioning device of FIG. 1.

FIG. 6 shows a side view of the embodiment of the commissioning device 1 already shown in the previous figures. This representation also omits some components. In the first shelf row 10 shown in the back, there are two shelves disposed side by side in this representation, with horizontal shelf surfaces 11. It can be seen that the distance between the individual shelf surfaces may vary even within a shelf. It is also seen that both input devices 61, 60 and the output device 70 extend out beyond the front side of the commissioning device 1, ending in a removal area 71 and two holding areas 62, 63.

Figure 7:
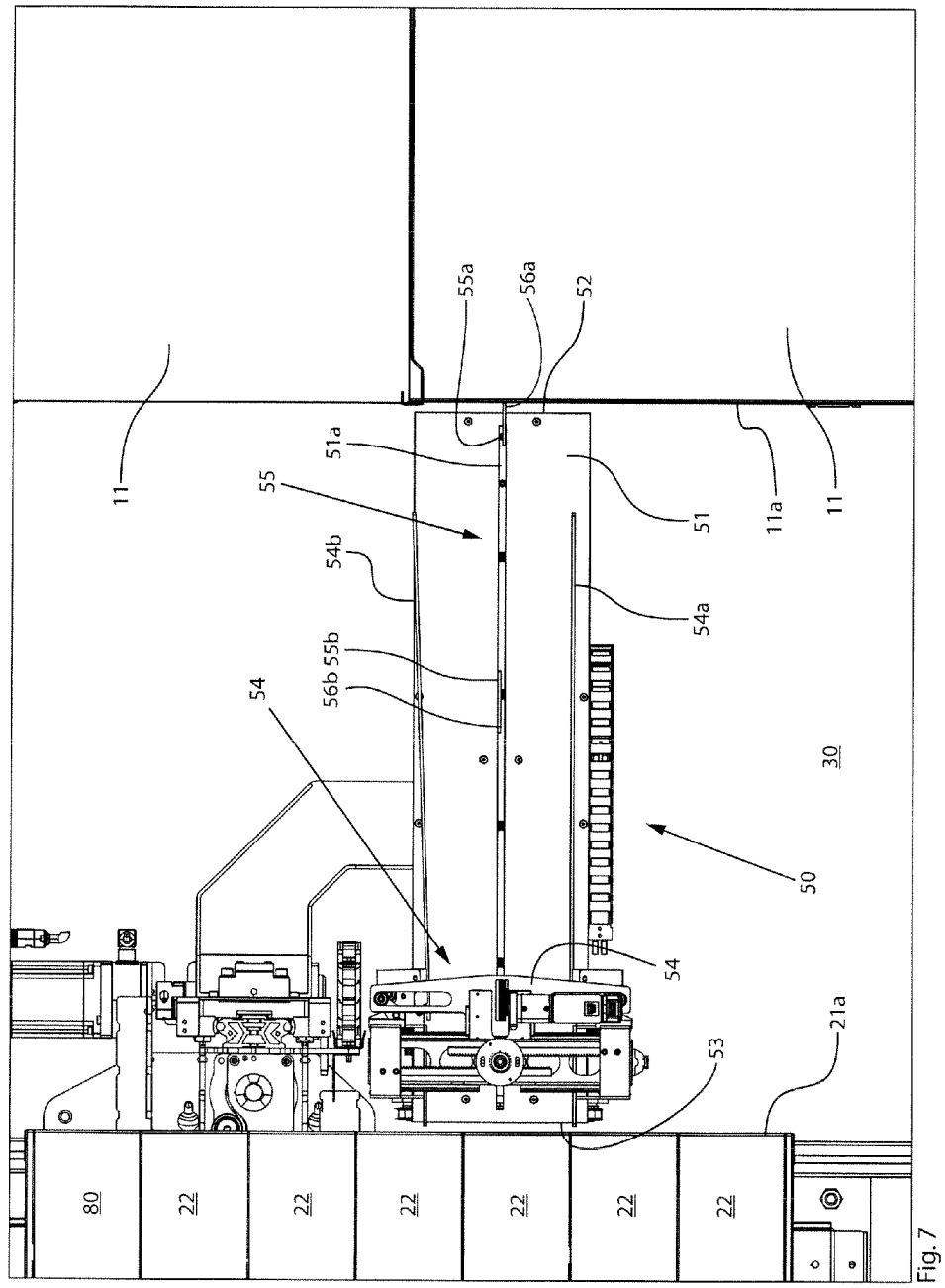
FIG. 7 is a top plan view of an embodiment of a gripping device.

FIG. 7 shows a detail view of the gripping device 50 of the operating unit 40 as well as the arrangement off the gripping device 50 between the first (e.g., right) and the second (e.g., left) shelf row 10, 20, the shelf surfaces 11, 21 of the shelf rows 10, 20 being visible. The gripping device 50 of the operating unit 40 includes a holding surface 51 that is in the form of a holding table in the embodiment shown.

There are two loading edges 52, 53 disposed at opposite ends of the holding surface 51, the loading edges 52, 53 ending just prior to the end edges/loading edges of the respective shelf surfaces 11, 21 of the first and the second shelf rows 10, 20. For example, lane 30 between the first and the second shelf rows 10, 20 is almost completely traversed, but the freedom of motion of the operating unit 40 in the lane is maintained. A corresponding configuration of the holding table and the holding surface 51 makes it possible to remove piece goods from the horizontal shelf surfaces 11 and to directly push these piece goods on or over the holding surface 51 to an inclined shaft 22 without having to move the holding table or the gripping device 50 to one of the shelf rows 10, 20.

To remove and move the piece goods, the gripping device 50 includes a gripper 54 that is designed as a jaw-type gripper with two gripping jaws 54a, 54b in the embodiment shown. Here, at least one of the two gripping jaws 54a, 54b of the gripper is pivotable in such a way that piece goods may be clamped between the gripping jaws 54a, 54b and thereby pulled from a horizontal shelf surface 11 onto the holding surface 51 of the gripping device 50. To this end, the gripper 54 is configured such that the gripping jaws 54a, 54b may be pushed into a shelf, wherein the insertion depth into the shelf depends on how many piece goods are to be removed from the corresponding shelf surface 11.

In order to move the piece goods from the holding surface 51 to the inclined storage shafts 22, the gripping device 50 includes a pushing device 55 in the embodiment shown. The pushing device 55 includes two pushers 55a, 55b that are movable in a notch 51a of the holding surface 51. Further, the pushers 55a, 55b in the embodiment shown are disposed in such a way that they may be moved under the plane of the holding surface 51. The pushers 55a, 55b include a pushing finger 56a, 56b that may be moved over a respective loading edge. With reference to pushing finger 56a, which is associated with loading edge 52, this means that the pushing finger 56a may be moved over loading edge 52. This is particularly important as the piece goods may be pushed onto the horizontal shelf surfaces 11 in such a way that the piece goods do not protrude out over the front loading edge 11a of the horizontal shelf surfaces 11.

Concerning pusher 55b, which is associated with loading edge 53, which is in turn associated with the second shelf row 20, pushing finger 56b may be moved over loading edge 53. This provides that piece goods lying on holding surface 51 may be pushed to a storage shaft 22 in such a way that the center of gravity of a piece good is pushed over loading edge 21a of the inclined shelf surface 21. Thus, the piece goods are certain to slide by the force of gravity in the inclined storage shaft 22 up to the gate (not shown in this representation) or up to a piece good that is already located in the storage shaft 22.

Figure 8:
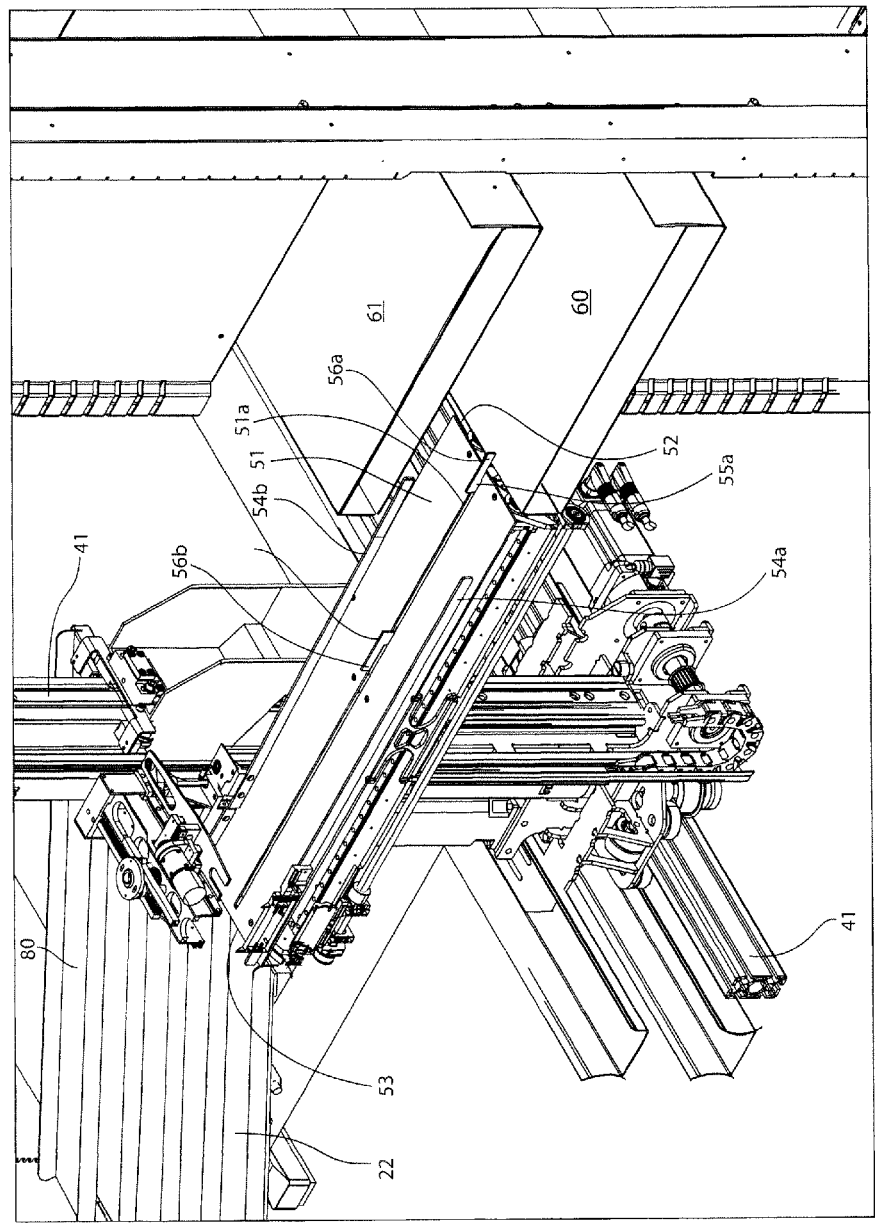
FIG. 8 is a perspective view of the gripping device of FIG. 7.

FIG. 8 shows another detailed view of the gripping device 50. What is particularly recognizable is that the pushers 55a, 55b may move inside of a notch 51a in the holding surface 51. In this representation, it can also be seen that the pushing finger 56a of pusher 55a may move over loading edge 52. The gripping device 50 of the operating unit 40 is arranged in such a way that piece goods may be removed from the input device 60. To do so, the pushers 55a, 55b must be movable under the plane of the holding surface 51. The arrangement and representation of the pushers 55a, 55b in FIG. 8 are for illustrative purposes only, as the pushers 55a, 55b are not so positioned while the commissioning device 1 is operating.

Figure 9:
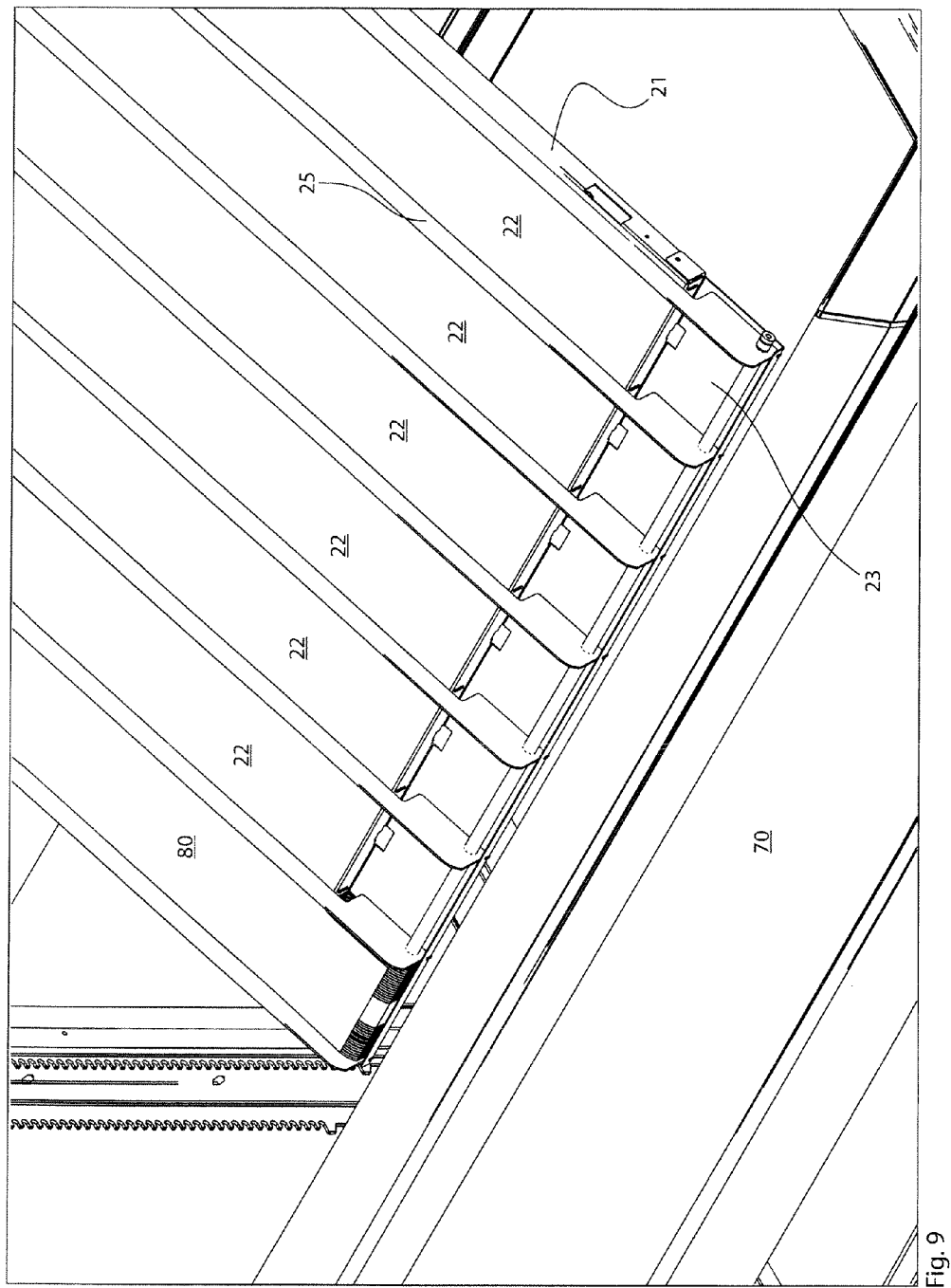
FIG. 9 is a perspective view of a portion of an embodiment of inclined storage shafts.

FIG. 9 shows a detailed view of multiple inclined storage shafts 22 formed on an inclined shelf surface 21. The individual storage shafts 22 are separated from one another by way of separating walls 25 that are disposed parallel to one another on the inclined shelf surface 21. At the lower end 24 of each inclined storage shaft 22 is a gate 23 that permits individual piece goods to be output out of the inclined storage shaft 22. The piece goods output from the storage shaft 22 fall onto the output device 70 by virtue of the arrangement of the inclined storage shaft 22 and the output device 70, and are output thereby through an opening in the front side of the commissioning device 1.

Also disposed on the inclined shelf surface 21 shown in FIG. 9 is the auxiliary output device 80, by way of which shelf-type piece goods 7 in particular may be output from the horizontal shelf surface 11. In some embodiments, the auxiliary output device 80 may also include two or more storage shaft widths or may be disposed next to the second shelf row 20 as a separate component, for example. The auxiliary output device 80 as shown here is a passive output device. For example, the piece goods are not moved by way of a motion by the output device itself. The auxiliary output device 80 may also be configured as an active output device. For example, as a conveyor belt that may be led directly out of the commissioning device 1.

Figure 10:
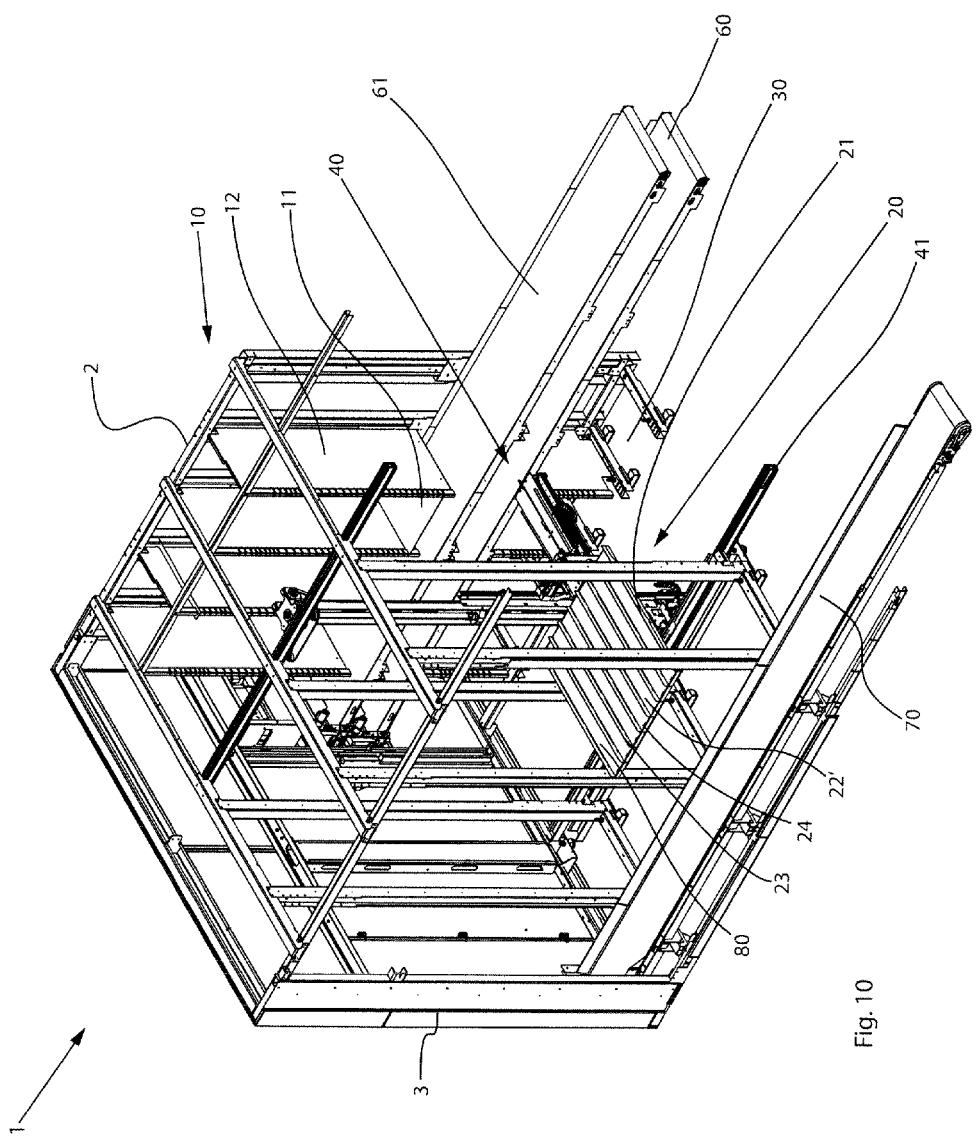
FIG. 10 is a perspective view of another embodiment of a commissioning device.
Figure 11:
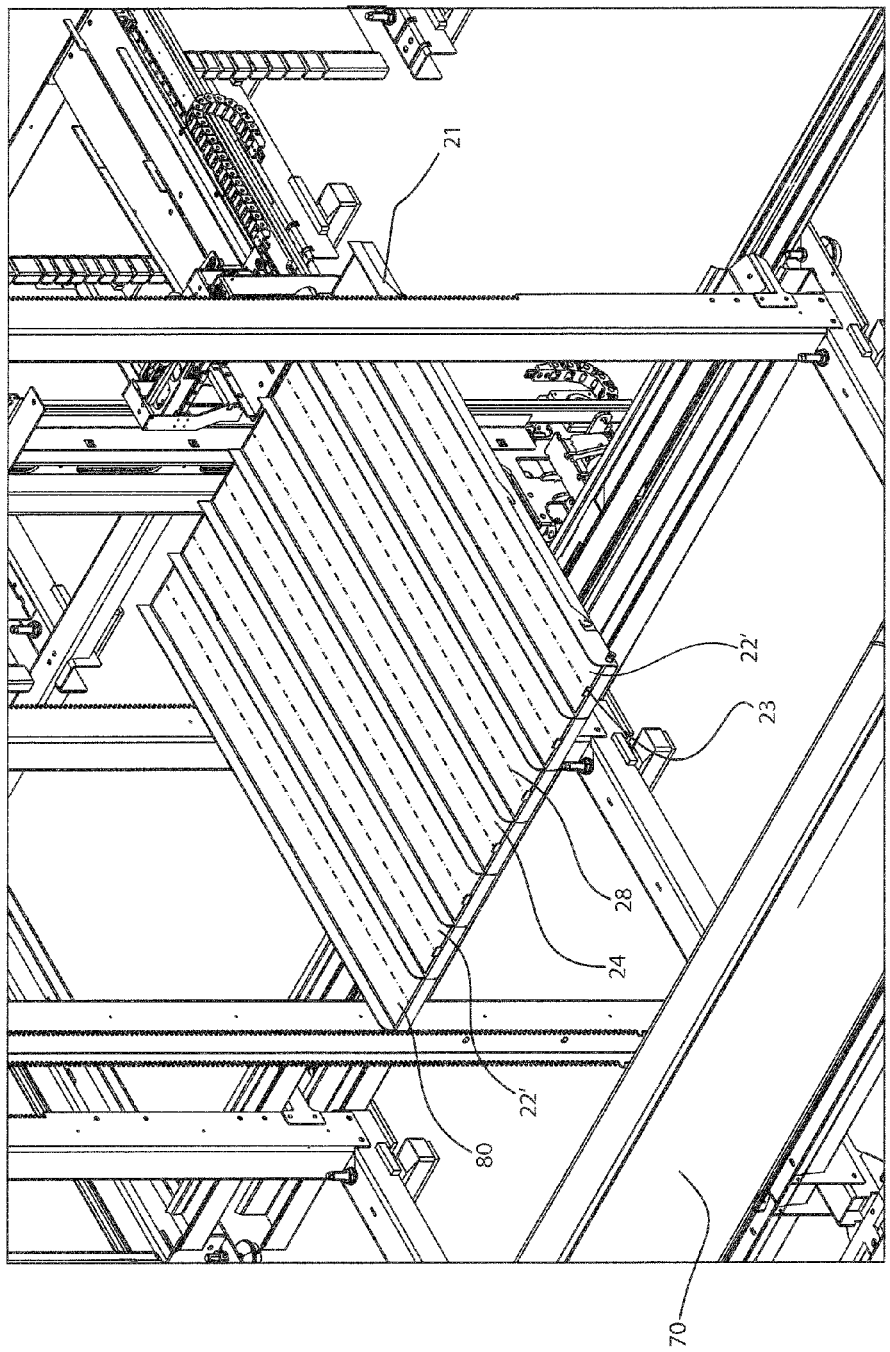
FIG. 11 is a perspective view of a portion of the commissioning device of FIG. 10.

FIG. 10 shows a perspective view of another embodiment, wherein in this embodiment horizontal storage shafts 22' are used. Here, the other components correspond substantially to those of the first embodiment so that there is no need to provide a detailed description. FIG. 11 shows a detailed view of a shelf surface of a shelf of the second shelf row 20 of the second embodiment, wherein the shelf surfaces 21 are configured to be horizontal. At the ends 24 of the shelf surfaces 21 are gates 23, there being a gate 23 associated with each storage shaft 22' and which may be operated separately by way of the control unit 90.

In this embodiment, the second shelf row 20 includes conveying device 28 for moving piece goods in the storage shafts 22'. In the embodiment shown, the conveying device 28 is configured as a conveyor belt beneath the surfaces of the storage shafts 22', wherein the surfaces of the storage shafts 22' have a notch through which a section of the conveying device 28 extends at least in sections so that there is contact between the stored piece goods and the conveying device 28. If a piece good is to be output, a gate 23 (or a plurality of gates) is opened and the conveying device 28 is activated. The conveying device 28 acts on all storage shafts 22' of the shelf surface 21, but where there are storage shafts 22' with unopened gates 23, the piece goods only move up against the gates 23 and are not output.

Methods of outputting piece goods using a commissioning device 1 are described below with reference to FIGS. 12a, 12b-15a, 15b, each of which show different respective method steps schematically. The figures are very simplified and only the essential features are shown and described.

Figure 12A:
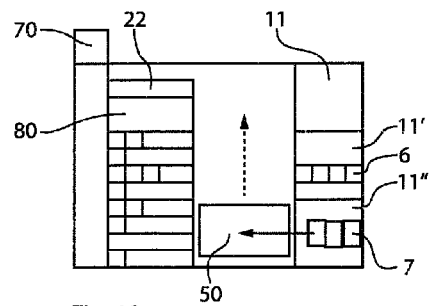
FIGS. 12A, 12B, 13A, 13B, 14A, 14B, 15A and 15B are illustrations of outputting piece goods using an embodiment of a commissioning device.
Figure 12B:
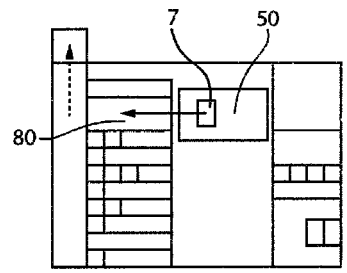

FIGS. 12A and 12B show two stages of a first embodiment of a method. The control unit 90 first determines whether the at least one piece good to be output is a shaft good 6 or a shelf good 7, the determination coming in reaction to an output request to the control unit 90. In the exemplary embodiment shown in FIGS. 12A, 12B, a shelf good 7 stored on horizontal shelf surface 11" is requested via an output request. The gripping device 50 is then moved to the horizontal shelf surface 11." As soon as the gripping device 50 is correctly positioned, the piece good 7 in question is grasped and moved to the holding surface. The gripping device 50 is moved to the auxiliary output device 80 and as soon as the gripping device 50 is correctly positioned, the piece good 7 is pushed onto the auxiliary output device 80 and proceeds therefrom to the output device 70, which moves the piece good 7 out of the commissioning device 1.

Figure 13A:
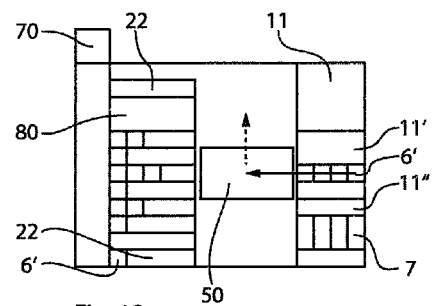
Figure 13B:
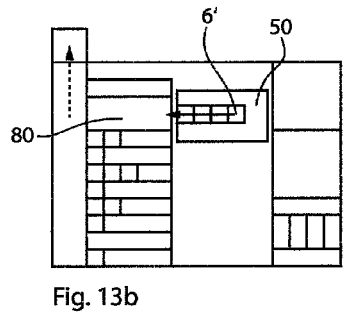

In the embodiment illustrated in FIGS. 13A and 13B, the output request is for four shaft goods 7. This kind of piece good is normally stored in inclined shaft 22. However, here the control unit 90 has determined that only one piece good 6' is present in inclined shaft 22. The gripping device 50 is then moved to shelf surface 11' where four piece goods 6' meeting the output request are stored as excess supply. All four piece goods 6' are grasped by the gripping device 50. Since it was determined that only one piece good 6' is present in inclined storage shaft 22, but the output request was for four piece goods, the gripping device 50 moves to the auxiliary output device 80 and all piece goods 6' located on the gripping device 50 are output using the auxiliary output device 80 and the output device 70.

Figure 14A:
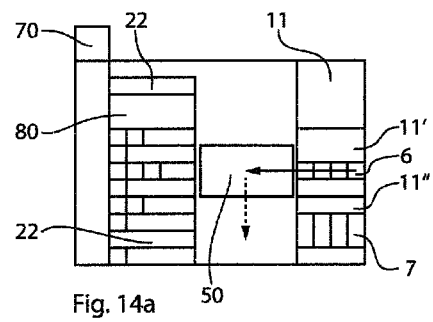
Figure 14B:
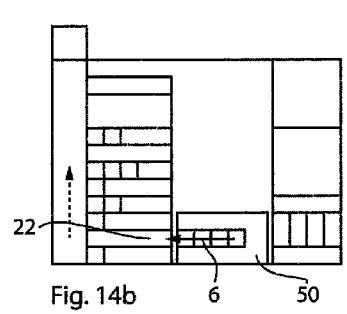

In the embodiment shown in FIGS. 14A and 14B, the output request is for two piece goods that are normally stored in inclined storage shaft 22. However, here the control unit 90 has determined that inclined storage shaft 22 is empty. Four piece goods 6 meeting the output request are removed from horizontal shelf surface 11' using the gripping device 50. Then, the gripping device 50 is moved in front of inclined storage shaft 22 and all piece goods 6 lying on the gripping device 50 are moved to inclined shaft 22. However, since the output request only included two piece goods 6, only two piece goods 6 are output and the other two piece goods 6 removed from horizontal shelf surface 11' remain in inclined storage shaft 22.

Figure 15A:
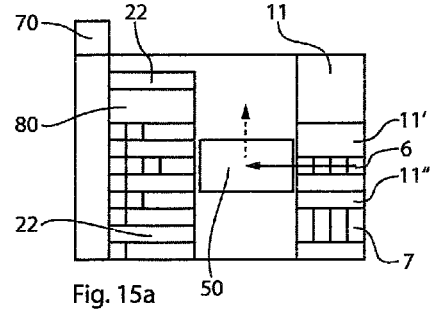
Figure 15B:
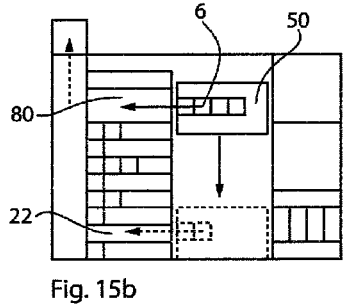

In embodiments illustrated in FIGS. 15A and 15B, two piece goods are again requested, and it is again determined that no piece goods meeting the output request are located in inclined storage shaft 22. Then, four piece goods 6 are grasped from horizontal shelf surface 11' using the gripping device 50. In these embodiments, the gripping device 50 is first moved to the auxiliary output device 80 and two of the four piece goods 6 located on the gripping device 50 are output using the auxiliary output device 80. The gripping device 50 with the two remaining piece goods 6 is moved to inclined storage shaft 22 and the two remaining piece goods 6 are moved to the inclined storage shaft 22 where they remain until the next corresponding output request.

The variant of the method that is used may depend on the load on the commissioning device 1 and on the storage situation. In each case, an optimum outputting variation may be determined by the control unit 90 for the current output request.

Figure 16:
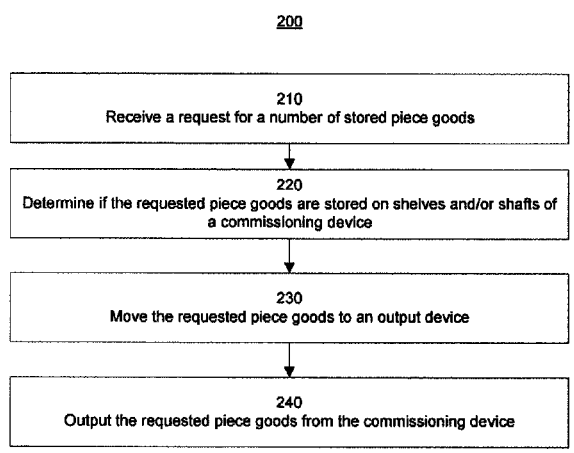
FIG. 16 is a flow chart illustrating steps in a method for outputting piece goods using an embodiment of a commissioning device.

FIG. 16 shows a flow chart illustrating steps in a method 200 for outputting piece goods, according to some embodiments. Method 200 may be performed in connection with a commissioning device (e.g., commissioning device 1) consistent with the present disclosure. Accordingly, the commissioning device in method 200 may include shelf rows (e.g., shelf rows 10, 20) for storing piece goods such as medication packages. A control unit (e.g., control unit 90) may determine whether a piece good to be output is stored in a shaft (e.g., shaft-type piece good 6) or stored on a shelf (e.g., shelf-type piece good 7). A gripping device (e.g., gripping device 50) may be used to grab a stored shelf good and move the shelf good to an output device (e.g., auxiliary output device 80), and then move the shelf good to another output device (e.g., output device 70) and out of the commissioning device. The gripping device may also be used to move shelf goods from a storage shelf to a storage shaft (e.g., inclined storage shaft 22).

Steps in method 200 may be performed at least partially by an operator, medical personnel, or a healthcare professional in a healthcare facility or in a drugstore, or in a pharma manufacturing facility. Accordingly, method 200 may be part of a medicament management or a drug logistic prepared by a physician or a healthcare professional. Moreover, method 200 may be performed automatically upon execution of a command provided by or controlled by a healthcare professional. For example, steps in method 200 may be programmed or directed with commands on computer-readable media, which, in some embodiments, can comprise non-transitory computer readable media.

Methods consistent with the present disclosure may include at least one of the steps illustrated in FIG. 16, performed in any order. In some embodiments, a method may include at least two of the steps illustrated in FIG. 16 performed overlapping in time, or even simultaneously. Moreover, embodiments consistent with the present disclosure may include at least one but not all of the steps illustrated in FIG. 16. Furthermore, methods consistent with the present disclosure may include more steps, in addition to at least one of the steps illustrated in FIG. 16. In some embodiments, one or more steps may be repeated.

Step 210 includes receiving a request at a control unit for outputting one or more piece goods. Step 220 includes determining by the control unit whether the piece goods to be output are stored on a shelf or in a shaft. In some embodiments, step 220 includes determining that all of the stored piece goods needed to meet the request are stored on one or more shelves, stored in one or more storage shafts, or a combination of both. Step 230 includes providing all of the requested piece goods to an output device. In some embodiments, step 230 includes moving one or more of the piece goods by a gripping device directly to the output device or to an auxiliary device that then moves the piece goods to the output device. Step 240 includes outputting the selected piece goods from the commissioning device.

It is understood that any specific order or hierarchy of blocks in the methods or processes disclosed is an illustration of example approaches. Based upon design or implementation preferences, it is understood that the specific order or hierarchy of blocks in the processes may be rearranged, or that all illustrated blocks be performed. In some implementations, any of the blocks may be performed simultaneously.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed is:

1. A commissioning device for piece goods, comprising:
   at least one first shelf row comprising a plurality of first shelf surfaces;
   at least one second shelf row comprising a plurality of second shelf surfaces;
   a lane formed between the first and the second shelf rows;
   an operating unit configured to travel horizontally and vertically in the lane;
   at least one input device configured to move piece goods into the commissioning device and from which the operating unit is configured to remove piece goods;
   at least one output device configured to output piece goods from the second shelf row; and
   at least one auxiliary output device configured to output piece goods held by the operating unit along an auxiliary output path, wherein a plurality of parallel storage shafts are disposed on each shelf surface of the second shelf row, each of the storage shafts comprising a gate at a shaft end, the gate configured to hold and release piece goods lying in the storage shaft, the output device configured to output the piece goods from the storage shafts along a main output path, wherein the operating unit comprises a gripping device for one of inputting and outputting piece goods onto or from the first and second shelf surfaces, and for filling the goods into the storage shafts; and
   a control unit coupled to the operating unit, the control unit configured to control the operating unit for inputting and outputting piece goods, wherein the operating unit is configured to remove identical piece goods lying in a row from the first shelf surfaces and place the removed piece goods into the storage shafts, and wherein the operating unit is configured to output one or more piece goods located on the first shelf surfaces and transfer the output piece goods to the auxiliary output device.

2. The commissioning device according to claim 1, wherein the second shelf surfaces incline downward away from the lane.

3. The commissioning device according to claim 2, wherein the inclined shelf surfaces of the second shelf row are configured to form storage shafts of varying heights.

4. The commissioning device according to claim 1, wherein the gripping device comprises:
a horizontal holding surface having opposite loading edges;
a gripper configured to input and output piece goods onto or from the horizontal shelf surfaces; and
a pushing device configured to push piece goods onto the horizontal holding surface, wherein a transport path for piece goods is formed between the loading edges and wherein the horizontal holding surface traverses the entire width of the lane.

5. The commissioning device according to claim 4, wherein the pushing device comprises two pushing members configured to move piece goods in opposite directions on the horizontal holding surface.

6. The commissioning device according to claim 5, wherein the pushing members are configured to be movable in a notch of the horizontal holding surface and under the horizontal holding surface.

7. The commissioning device according to claim 5, wherein the pushing members each comprise a pushing finger configured to be movable over at least one of the loading edges.

8. The commissioning device according to claim 1, wherein the auxiliary output device is disposed on a second shelf surface.

9. The commissioning device according to claim 8, wherein the auxiliary output device is configured as a storage shaft without a gate.

10. A method for outputting piece goods from a commissioning device, the method comprising:
providing the commissioning device of claim 1;
receiving an output request for at least one piece good;
determining, by the control unit, whether the at least one piece good to be output is a shaft good or a shelf good;
if it is determined that the good is a shelf good, grasping and transferring a number of the at least one piece goods corresponding to the output request to the auxiliary output device by the operating unit;
if it is determined that the good is a shaft good, determining whether there is a corresponding number of the at least one piece goods stored in the storage shafts;
if it is determined that a corresponding number of the at least one piece goods is stored in the storage shafts, outputting the number of the at least one piece goods corresponding to the output request out of the commissioning device and onto the output device; and
if it is determined that a corresponding number of the at least one piece goods is not stored in the storage shafts, grasping and outputting a plurality of the at least one piece goods stored on horizontal shelf surfaces corresponding to the output request by the operating unit.

11. The method according to claim 10, further comprising outputting the piece goods not stored in the storage shafts by:
moving the operating unit to the auxiliary output device; and transferring a number of piece goods corresponding to the output request to the auxiliary output device and outputting the piece goods.

12. The method according to claim 10, further comprising outputting the piece goods not stored in the storage shafts by:
moving the operating unit to a storage shaft; transferring all piece goods in the storage shaft; and actuating the gate of an inclined storage shaft or shafts such that a number of piece goods corresponding to the output request are output onto the output device.

13. A commissioning device, comprising:
a first shelf row comprising one or more first shelf surfaces;
a second shelf row comprising one or more second shelf surfaces;
a plurality of parallel storage shafts disposed on each second shelf surface, each of the storage shafts comprising a gate disposed at an end, the gate configured to hold and release piece goods stored in the storage shaft;
an operating unit configured to be movable in a lane disposed between the first and second shelf rows, the operating unit comprising a gripping device configured to input piece goods onto the first shelf surfaces, output piece goods from the first shelf surfaces, and fill piece goods into the storage shafts;
an input device configured to move piece goods into the commissioning device;
an output device configured to output piece goods from the storage shafts along a main output path;
an auxiliary output device configured to output piece goods held by the operating unit along an auxiliary output path; and
a control unit configured to control the operating unit for inputting and outputting piece goods.

14. The commissioning device according to claim 13, the operating unit further configured to remove identical piece goods lying in a row from the one or more first shelf surfaces and place the removed piece goods into the storage shafts.

15. The commissioning device according to claim 13, the operating unit further configured to output one or more piece goods located on the one or more first shelf surfaces and transfer the output piece goods to the auxiliary output device.

16. The commissioning device according to claim 13, the operating unit further configured to remove piece goods from the input device.

17. The commissioning device according to claim 13, wherein the gripping device comprises:
a holding surface having opposite loading edges;
a gripper configured to input and output piece goods onto or from the first shelf surfaces; and
a pushing device configured to push piece goods onto the holding surface, wherein a transport path for piece goods is formed between the loading edges and wherein the holding surface traverses the entire width of the lane.

18. The commissioning device according to claim 17, wherein the pushing device comprises two pushing members, a first pushing member configured to move piece goods in a first direction on the holding surface and a second pushing member configured to move piece goods in a second direction on the holding surface.

19. The commissioning device according to claim 18, the first and second pushing members each comprising a pushing finger configured to be movable past at least one of the loading edges, the first and second pushing members each configured to be movable in a notch of the horizontal holding surface and under the horizontal holding surface.

20. The commissioning device according to claim 13, wherein the auxiliary output device is disposed on a second shelf surface and comprises a storage shaft without a gate.

\* \* \* \* \*